US008886963B2

(12) United States Patent
Sauerwald et al.

(10) Patent No.: US 8,886,963 B2
(45) Date of Patent: Nov. 11, 2014

(54) SECURE RELOCATION OF ENCRYPTED FILES

(75) Inventors: Conrad Sauerwald, Mountain View, CA (US); Daniel J. Post, Campbell, CA (US); Eric Brandon Tamura, Mountain View, CA (US); Matthew J. Byom, San Jose, CA (US); Puja Dilip Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 13/233,090

(22) Filed: Sep. 15, 2011

(65) Prior Publication Data

US 2013/0073870 A1 Mar. 21, 2013

(51) Int. Cl.
*G06F 21/00* (2013.01)
*G06F 21/62* (2013.01)

(52) U.S. Cl.
CPC ................ *G06F 21/6218* (2013.01)
USPC ........... 713/193; 713/189; 707/693; 707/802; 707/812; 711/165

(58) Field of Classification Search
CPC ........ G06F 21/10; G06F 21/60; G06F 3/0646
USPC ................. 713/189, 193; 707/693, 802, 812; 711/165
See application file for complete search history.

(56) References Cited

U.S. PATENT DOCUMENTS

| | | | | |
|---|---|---|---|---|
| 6,253,300 B1 * | 6/2001 | Lawrence et al. | ............. | 711/173 |
| 6,795,834 B2 * | 9/2004 | Higashiura et al. | .................. | 1/1 |
| 7,325,115 B2 * | 1/2008 | Leis et al. | ...................... | 711/164 |
| 7,409,523 B2 * | 8/2008 | Pudipeddi et al. | ............. | 711/173 |
| 7,765,189 B2 * | 7/2010 | Yamakawa | .................... | 707/640 |
| 8,190,850 B1 * | 5/2012 | Davenport et al. | ........... | 711/202 |
| 2001/0009582 A1 * | 7/2001 | Kotani et al. | ................. | 380/277 |
| 2001/0039613 A1 * | 11/2001 | Ohishi | .......................... | 713/156 |
| 2002/0166053 A1 * | 11/2002 | Wilson | .......................... | 713/189 |
| 2003/0070082 A1 * | 4/2003 | Nimura et al. | ................. | 713/193 |
| 2004/0172549 A1 * | 9/2004 | Kojima et al. | ................. | 713/193 |
| 2005/0172065 A1 * | 8/2005 | Keays | ............................ | 711/103 |
| 2006/0277413 A1 * | 12/2006 | Drews | .......................... | 713/189 |
| 2007/0266220 A1 * | 11/2007 | Nelson | .......................... | 711/170 |
| 2008/0063209 A1 * | 3/2008 | Jaquette et al. | ................ | 380/284 |
| 2008/0307020 A1 * | 12/2008 | Ko et al. | ........................ | 707/204 |
| 2009/0052670 A1 * | 2/2009 | You et al. | ....................... | 380/277 |

(Continued)

OTHER PUBLICATIONS

Sauerwald et al., U.S. Appl. No. 13/204,171, filed Aug. 5, 2011.

*Primary Examiner* — Christopher Revak
*Assistant Examiner* — Sarah Su
(74) *Attorney, Agent, or Firm* — Blakely, Sokoloff, Taylor & Zafman LLP

(57) ABSTRACT

Systems and methods are disclosed for secure relocation of encrypted files for a system having non-volatile memory ("NVM"). A system can include an encryption module that is configured to use a temporary encryption seed (e.g., a randomly generated key and a corresponding initialization vector) to decrypt and encrypt data files in an NVM. These data files may have originally been encrypted with different encryption seeds. Using such an approach, data files can be securely relocated even if the system does not have access to the original encryption seeds. In addition, the temporary encryption seed allows the system to bypass a default key scheme.

19 Claims, 4 Drawing Sheets

(56) References Cited

U.S. PATENT DOCUMENTS

| | | |
|---|---|---|
| 2009/0208010 A1* | 8/2009 | Junod et al. .................... 380/239 |
| 2009/0235017 A1* | 9/2009 | Estakhri et al. ................ 711/103 |
| 2009/0316897 A1* | 12/2009 | Kambayashi et al. ......... 380/255 |
| 2010/0122015 A1* | 5/2010 | Fusella et al. ................. 711/103 |
| 2010/0229005 A1 | 9/2010 | Herman et al. |
| 2011/0185190 A1* | 7/2011 | Berengoltz et al. ........... 713/189 |
| 2011/0276805 A1* | 11/2011 | Nagpal et al. ................. 713/189 |
| 2012/0151120 A1* | 6/2012 | Post et al. ..................... 711/103 |

* cited by examiner

SECURE RELOCATION OF ENCRYPTED FILES

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

Systems having an NVM can sometimes encrypt data stored in the NVM using one or more media keys. The encrypted data may later be read through a decryption process using the same media keys. During system upgrades, encrypted data may need to be relocated to a different location in the NVM in order to free up space. Because the system may not have access to the media keys during this process, encrypted data cannot easily be relocated.

Although the system can attempt to relocate the encrypted data using no keys, some system implementations will automatically provide default keys during no-key accesses. Moreover, usage of these default keys during relocation can cause data corruption.

SUMMARY OF THE DISCLOSURE

Systems and methods are disclosed for secure relocation of encrypted files for a system having non-volatile memory ("NVM"). A system can include an encryption module that is configured to use a temporary encryption seed (e.g., a randomly generated key and a corresponding initialization vector) to decrypt and encrypt data files in an NVM. These data files may have originally been encrypted with a different set of encryption seeds. Using the temporary encryption seed, the data files can be relocated even if the system does not have access to the original encryption seeds. In addition, the temporary encryption seed allows the system to bypass a default key scheme.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for secure relocation of encrypted data for a system having non-volatile memory ("NVM") are provided. The system can include an NVM interface that can locate encrypted data in the NVM and read the encrypted data into volatile memory using a temporary encryption seed (e.g., a randomly generated key and an initialization vector ("IV") generated using the randomly generated key). The randomly generated key can be generated by a resize module of a file system. The encrypted data may have originally been encrypted with a different encryption seed (e.g., a media key and corresponding IV).

After reading the encrypted data, the NVM interface can program the file back out to a new location in the NVM using the same temporary encryption seed. This approach allows the NVM interface to relocate the encrypted data even though the system does not have access to the file's original media key. In addition, the temporary encryption seed allows the system to bypass a default key scheme.

Figure 1:
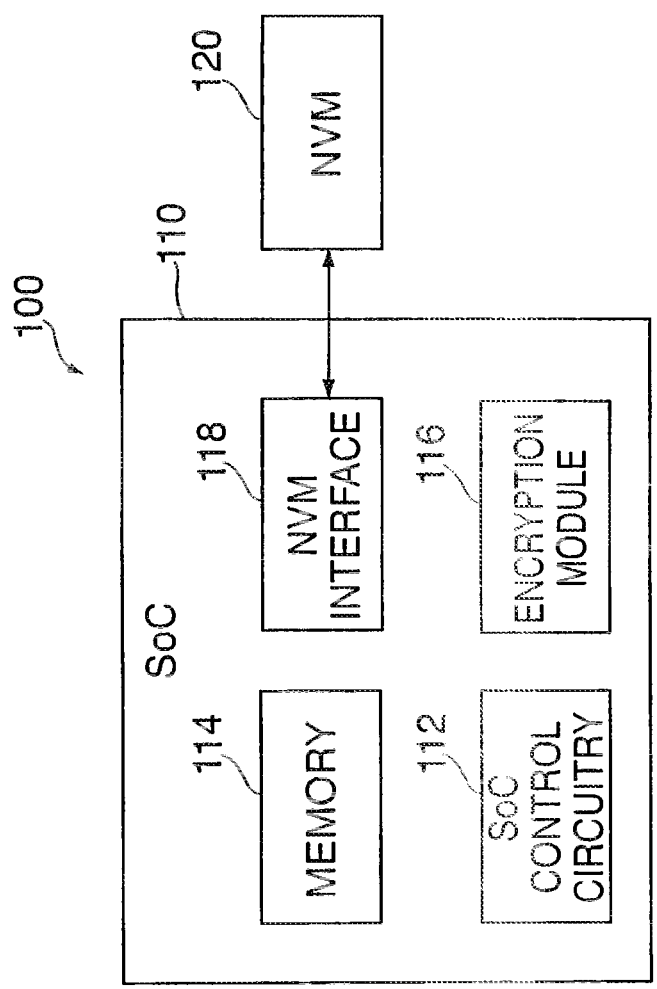
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

System-on-a-chip 110 can include SoC control circuitry 112, memory 114, encryption module 116, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112. Memory 114 can store firmware or software applications that may be executed by SoC control circuitry 112 or NVM interface 118, can provide temporary storage for the firmware or software, or a combination thereof.

Encryption module 116 can be or may include any hardware or software, or combination thereof, configured to perform encryption and decryption based on a suitable cipher. For example, encryption module 116 can be based on the Advanced Encryption Standard ("AES"), Data Encryption Standard ("DES"), or RSA. Encryption module 116 can provide security for sensitive data, such as personal information or billing information, stored in NVM 120 or transmitted/received to/from electronic device 100 (e.g., using communications circuitry not shown in FIG. 1). In addition to providing security, the encryption algorithm used by encryption module 116 may provide the added feature of whitening or randomizing the data (e.g., sensitive or non-sensitive data) it encrypts. As used herein, a "whitening process" can refer to a process in which the randomness of a sequence of data is purposely increased. This can reduce the likelihood of a data sequence having a highly disproportionate number of ones or zeros, which consequently may improve reliability in writing data to and reading data from the NVM (e.g., reduce program-disturbs) and increase security.

Encryption module 116 can encrypt and decrypt data using one or more "encryption seeds" provided by SoC control circuitry 112 or a system key store (not shown in FIG. 1), which may be required by the encryption algorithm to perform encryption or decryption. In some embodiments, and particularly for AES-based encryption modules, the encryption seeds can include a key and an initialization vector ("IV"). To recover the original unencrypted data from encrypted data, the encryption seeds used for decryption may be the same as the seeds originally used for encryption. Data encryption and decryption will be discussed in more detail in connection with FIGS. 2-4.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120. As another example, NVM interface 118 can direct encryption module 116 to whiten data that will be stored on NVM 120 and moving pages of data between physical locations of NVM 120 during wear leveling or garbage collection.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC control 110 or SoC control circuitry 112 may act as the host controller for the target device. For example, as the host controller, SoC 110 can issue read and write requests to the target device.

Figure 2:
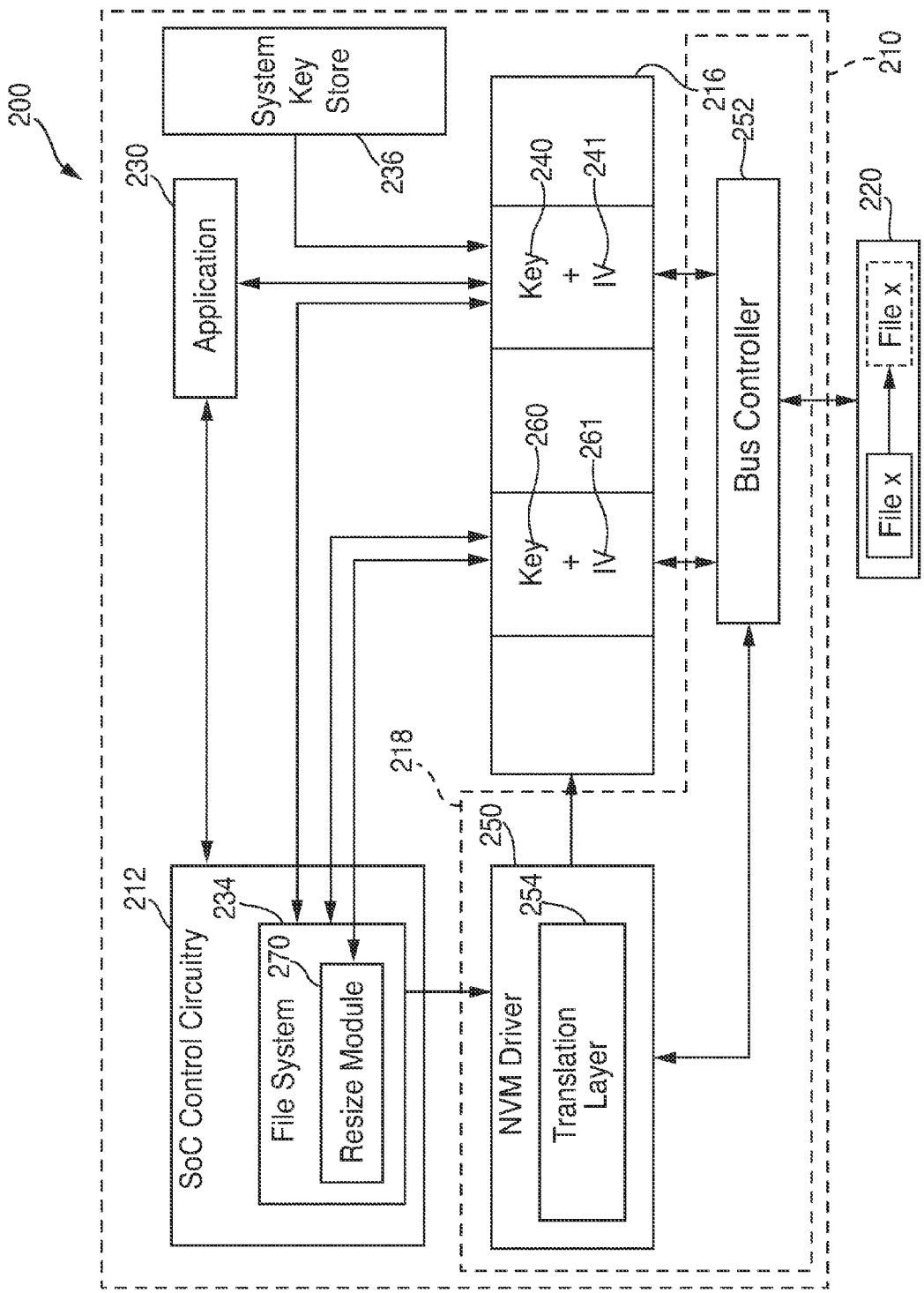

Turning now to FIG. 2, a block diagram of electronic device 200 is shown. Electronic device 200 can be the same as or similar to electronic device 100 of FIG. 1. Electronic device 200 can include SoC 210, which can be a more detailed view of SoC 110 or can be a completely different implementation of a system-on-a-chip. SoC 210 can include SoC control circuitry 212, encryption module 216, and NVM interface 218, which may each have any of the features and functionalities described above in connection with their like-named components of FIG. 1, and vice versa. For example, in some embodiments, encryption module 216 can be or can include an Advanced Encryption Standard ("AES") engine, which may be configured to receive one or more encryption seeds (e.g., one or more key and IV inputs).

SoC control circuitry 212 can provide the general functionalities of electronic device 200. For example, SoC control circuitry 212 can execute any application 230 (e.g., music or other media applications) initiated by the user and can include the operating system of the electronic device. During operation, application 230 and other programs or firmware may need to store or retrieve data from NVM 220, which may be the same as or similar to NVM 120 of FIG. 1. SoC control circuitry 212 may allocate this data as "sensitive" or "non-sensitive" information based on a variety of factors, such as the type of information, which application is being executed, or the particular user operating the electronic device. "Sensitive data" may generally refer to any information that is provided for storage with an instruction from file system 234 or application 230 to encrypt the data. Sensitive data can include, for example, personal information (e.g., user password) and credit card information. "Non-sensitive data" can include data that may not need to be encrypted such as, for example, system partition data, library data, framework data, and other types of application data where protection is unnecessary.

SoC control circuitry 212 can include file system 234 to issue the read and write commands instructed by application 230 or an operating system. File system 234 can include any suitable type of file system, such as a File Allocation Table (FAT) file system or a Hierarchical File System Plus ("HFS+"). With each read or write command, file system 234 can provide a logical address to indicate where a file should be read or written.

File system 234 can also provide information on whether the operating system or application 230 has determined that a particular file is sensitive. Thus, in some embodiments, along with a read or write command that is associated with a sensitive file, media key 240 can be supplied by file system 234.

In other embodiments, media key 240 can be supplied by system key store 236 on behalf of application 230. Consequently, each media key that is generated can be associated with a particular application, and may be unique to the application. Moreover, in some cases, media keys can also be unique for each file. System key store 236 can be stored in a memory module of device 200 (not shown in FIG. 2). This memory module can be located at any suitable location in SoC 210, such as internal to SoC control circuitry 212, external to SoC control circuitry 212 (e.g., memory 114 of FIG. 1), or internal or external to NVM interface 218.

For each logical block of a file, file system 234 can also generate IV 241, which can be based at least in part on media key 240. IV 241 can be used by encryption module 216 to provide additional randomization of data. Particularly for AES-based encryption modules, if the same key is applied to two sets of identical data, the same outputs may be produced. This is because AES behaves deterministically if provided with the same keys and data. As a result, data security can be compromised because it may be easy to identify macro-level patterns within files.

In contrast, by applying IV 241 as an input to the encryption module in addition to media key 240, identical sets of data can be encrypted differently. Persons skilled in the art will appreciate IV does not necessarily have to be an input to encryption module 216. Thus, in some cases, encryption module 216 can encrypt a file using only media key 240.

In some embodiments, IV 241 can be generated based on the logical block address ("LBA") where data is located on NVM 220. In other embodiments, IV 241 can be generated for each logical block of a file. For instance, for a file with size 2 MB, file system 234 can split the file into 500 logical blocks of size 4 KB. Then, for each logical block, IV 241 can be generated based on a cryptographic hash of media key 240 and an offset into a file corresponding to the logical block (e.g., a logical block number). For instance, if logical block 1 of a file is currently being programmed in NVM 220, the offset into the file is logical block 1, which can be one of the inputs of IV 241. In some cases, IV 241 may also be divided by a pre-determined value (e.g., 4 KB).

Using such an approach, multiple IVs can be generated for a file having multiple logical blocks. In addition, the IV that is generated for each logical block of a file can be independent of the logical block's location in NVM 220. Consequently, when the system later moves a file for purposes of fragmentation or defragmentation, the same encryption seed (e.g., media key 240 and IV 241) can be used to read the file, thereby maintaining data coherency.

In contrast to a sensitive file, if a file is determined to be non-sensitive, file system 234 may not provide a valid encryption seed. Instead, file system 234 may provide a default encryption seed (e.g., default values in place of media key 240 and IV 241) such that encryption module 216 can perform default whitening on the file. By using a default encryption seed as input to the encryption algorithm, encryption module 116 can still improve reading and programming reliability. In some embodiments, the default IV can be assigned a value based on one or more logical block addresses ("LBAs") associated with a file.

File system 234 can provide read and write requests to NVM interface 218 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM interface 218 can include NVM driver 250 and bus controller 252. NVM driver 250 can include translation layer 254. In some embodiments, translation layer 254 may be or include a flash translation layer ("FTL"). On a write request, translation layer 254 can map the provided logical address to a free, erased physical location on NVM 220. On a read request, translation layer 254 can use the provided logical address to determine the physical address at which the requested data is stored. Because each NVM may have a different layout depending on the size or vendor of the NVM, this mapping operation may be memory and/or vendor-specific.

In some embodiments, NVM driver 250 may interface with NVM bus controller 252 to complete NVM access requests (e.g., program, read, and erase requests). Bus controller 252 may act as the hardware interface to NVM 220, and can communicate with NVM 220 using the bus protocol, data rate, and other specifications of NVM 220.

NVM interface 218 can enable encryption module 216 to whiten data prior to having bus controller 252 program the data onto NVM 220. In some embodiments, translation layer 254 can enable encryption module 216 to encrypt all data (e.g., sensitive and non-sensitive data) prior to storage. Subsequently, encryption module 216 can apply an encryption seed (e.g., media key 240 and IV 241) to the data. NVM interface 218 can then direct bus controller 252 to program the encrypted data onto NVM 220. For example, as shown in FIG. 2, file X, which may be associated with application 230, may have been encrypted with media key 240 and IV 241 and then programmed onto NVM 220.

When the encrypted data is read back at a later time, NVM interface 218 can enable encryption module 216 to decrypt the data using the same encryption seed. For example, using media key 240 and IV 241 as a filter, encryption module 216 can access the contents of file X (e.g., the plaintext version of file X) from the encrypted version that has been read back.

In some cases, device 200 may be operating in a state where system key store 236 cannot be accessed. Consequently, encryption module 216 may be unable to access the media keys that were used to encrypt data in NVM 220. For example, system key store 236 may not be accessible while device 200 is operating in a locked state. As another example, system key store 236 may not be accessible while device 200 is operating in an environment where a user is unable to type in a pin code. This may be desirable for security purposes such that access to system key store 236 is granted only when the user enters a pin code.

During these instances, encrypted data stored on NVM 220 may still need to be relocated. For example, during an upgrade of an operating system, boot data associated with the update may need to be stored in NVM 220. As another example, data associated with a different file system may need to be stored in NVM 220. Thus, in order to create a temporary partition for storing additional data, one or more existing data partitions in NVM 220 may need to be reduced. For example, the portion of NVM 220 that is used to store data associated with file system 234 may need to be resized. This may require at least some of the data files associated with file system 234 to be relocated to different locations in NVM 220. For instance, as shown in FIG. 2, NVM interface 218 may determine that file X is file system data, and is located in a portion of NVM 220 that needs to be freed up. As a result, NVM interface 218 can relocate file X to a new location, which is indicated by the dashed box in NVM 220.

Although it is sometimes possible to relocate encrypted files in an NVM without a key, such an approach can cause incoherencies for some systems. That is, some system implementations do not allow files to be programmed without an encryption scheme. Instead, in order to provide a consistent interface to NVM driver 250, file system 234 may either provide valid encryption seeds for sensitive files or default encryption seeds for non-sensitive files. As discussed previously, default encryption seeds can allow encryption module 216 to perform default whitening on user data.

Given such an implementation, if an encrypted file is read and programmed without a key for purposes of relocation, file system 216 (or NVM driver 250) may automatically provide a default encryption seed. The default encryption seed, however, may be associated with different IVs for reading and programming data. In particular, the IVs can be based on one or more LBAs associated with a file, which can change when the file is relocated. This consequently may cause data corruption because it becomes impossible to relocate a file in a consistent way. The same IV is therefore needed for both reading and programming during data relocation.

Accordingly, in order to bypass a default key scheme, encryption module 216 can use a temporary encryption seed (e.g., randomly generated key 260 and IV 261) to "decrypt" and "encrypt" data files stored in NVM 220. "Decrypting" an encrypted file using a temporary encryption seed may transform the file into an unintelligible file. However, by "encrypting" the unintelligible file using the same temporary encryption seed and programming the file back to NVM 220, the unintelligible file can again be transformed into its original encrypted form. Moreover, by relying on AES symmetry, the data files can be relocated seamlessly during system upgrades without requiring any user input (e.g., without having access to media keys).

For example, as shown in FIG. 2, NVM interface 218 can locate file X and read it into memory (e.g., memory 114 of FIG. 1) using a temporary encryption seed (e.g., randomly generated key 260 and IV 261). That is, after having bus controller 252 read file X, NVM interface 218 can enable encryption module 216 to decrypt the file using the temporary encryption seed.

After the file has been decrypted using the temporary encryption seed, NVM interface 218 can program the file back out to NVM 220 onto a new location (e.g., the location indicated by the dashed box in NVM 220) using the same temporary encryption seed. For example, NVM interface 218 can enable encryption module 216 to encrypt file X using the temporary encryption seed prior to having bus controller 252 program the file onto NVM 220.

Randomly generated key 260 can be generated by resize module 270, which can reside in file system 234. Persons skilled in the art will appreciate that resize module 270 can reside in any other suitable location in device 200 such as NVM interface 218 or encryption module 216, for example.

Random generated key 260 can be an AES key, and unlike media key 240, key 260 may not be associated with application 230. Thus, in some embodiments, resize module 270 can provide the same randomly generated key 260 for all files that need to be relocated. This can improve system efficiency since key 260 may be a temporary key that is not useful for other purposes. In other embodiments, resize module 270 can randomly generate a unique key 260 for each file that needs to be relocated in NVM 220. As discussed above, IV 261 may be generated by file system 234 based at least in part on randomly generated key 260 (e.g., based on key 260 and a file offset).

Figure 3:
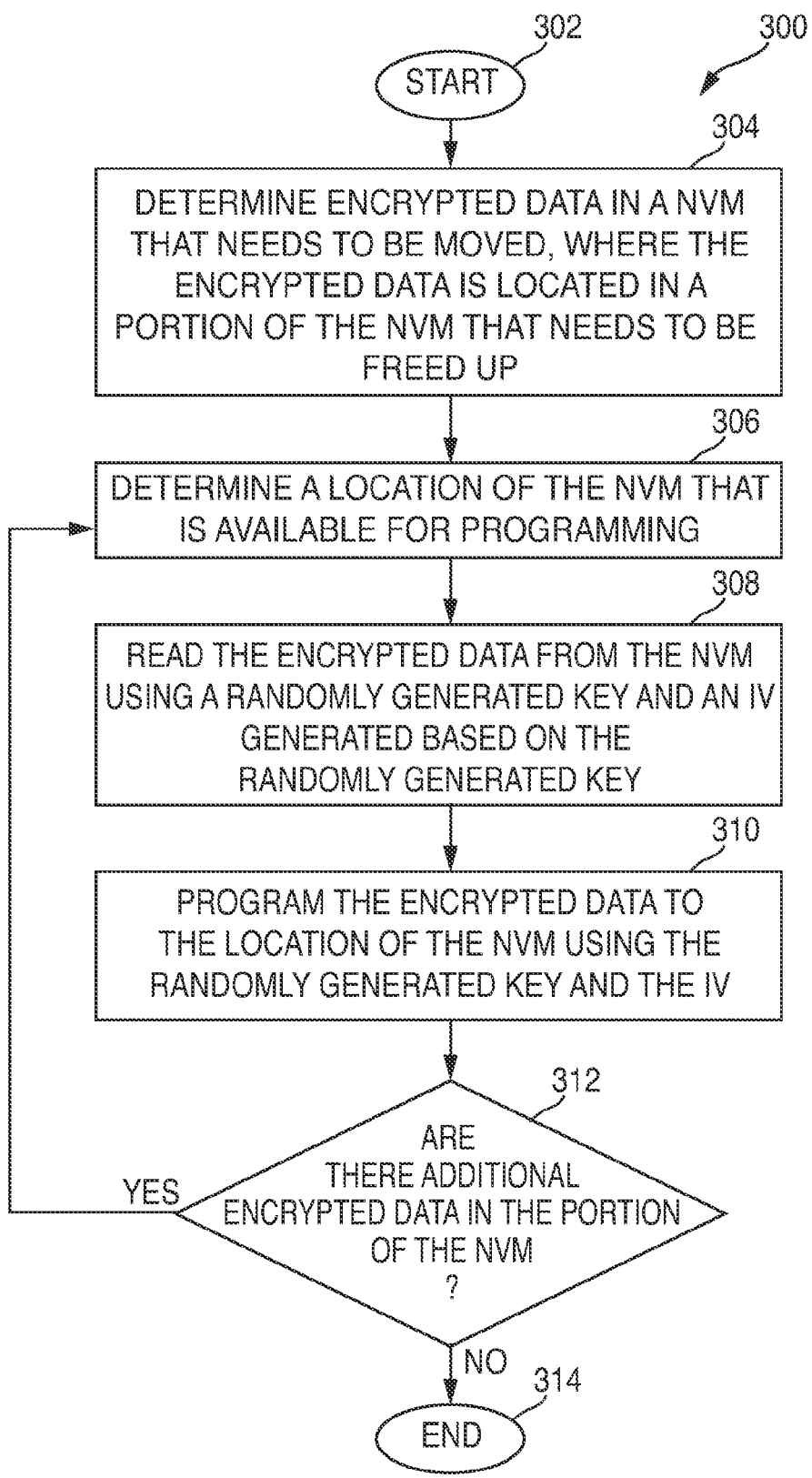
FIG. 3 is a flowchart of an illustrative process for secure relocation of encrypted data in accordance with various embodiments of the invention.

Turning now to FIG. 3, a flowchart of process 300 is shown for secure relocation of encrypted data. The steps of process 300 can be executed by a memory interface, such as NVM interface 118 of FIG. 1 or NVM interface 218 of FIG. 2, or by any component or combination of components of an electronic device. However, for purposes of clarity and not of limitation, process 300 will be described as being performed by an NVM interface.

Process 300 may begin at step 302, and at step 304, the NVM interface can determine encrypted data (e.g., file X of FIG. 2) in an NVM (e.g., NVM 120 of FIG. 1 or NVM 220 of FIG. 2) that needs to be moved, where the encrypted data is located in a portion of the NVM that needs to be freed up.

Figure 4:
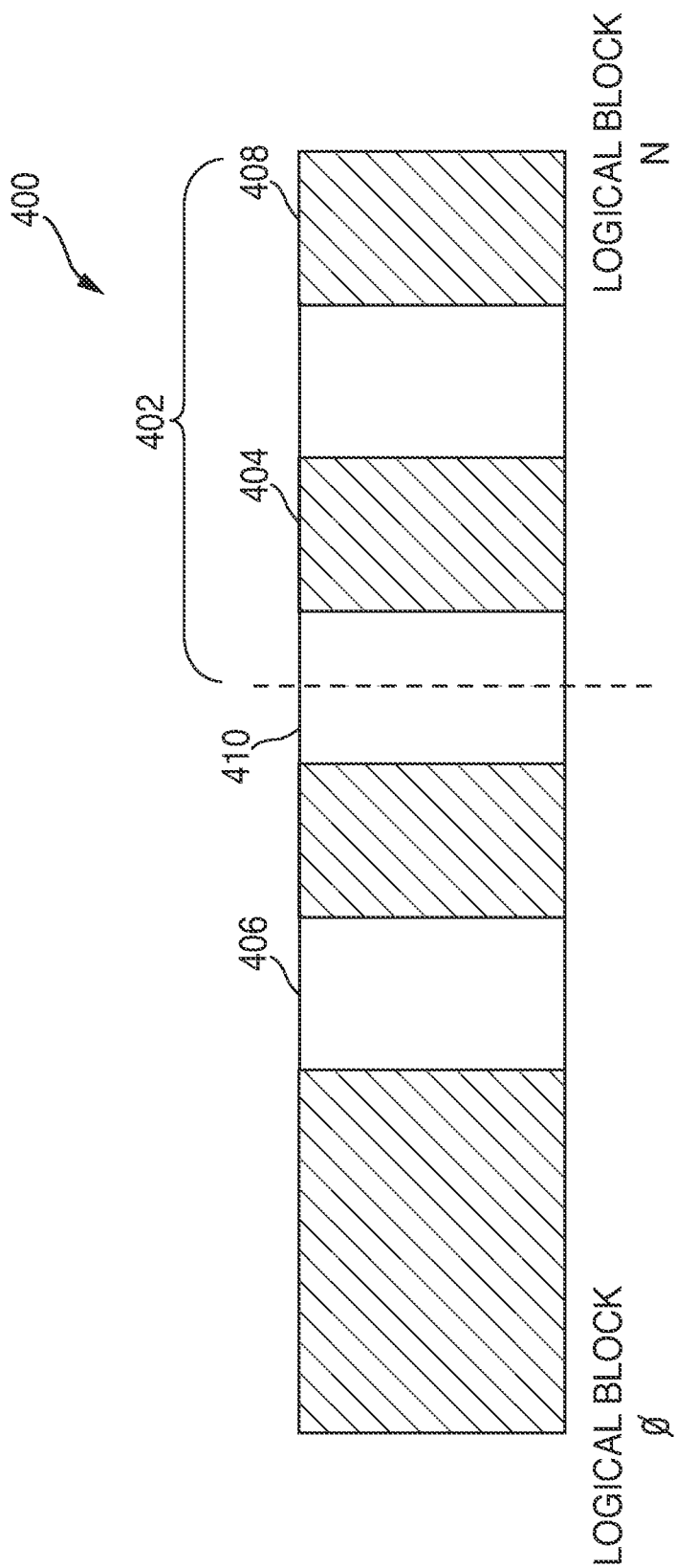
FIG. 4 is a graphical representation of logical blocks of a non-volatile memory in accordance with various embodiments of the invention.

For example, referring to FIG. 4, a graphical representation of logical blocks (e.g., logical blocks 0-N) of NVM 400 is shown. Logical blocks 0-N may correspond to one or more physical blocks, and may be used to store data associated with a file system (e.g., file system 234 of FIG. 2). As shown in FIG. 4, dashed regions of NVM 400 can indicate locations that have already been programmed, and non-dashed regions can indicate locations that are available for programming.

In some cases (e.g., during system upgrades), one or more existing data partitions of NVM 400 may need to be reduced. In some embodiments, this can be achieved by relocating data in an end portion of the data that is associated with a file system. Persons skilled in the art will appreciate that any suitable portion of data that is associated with a file system may be relocated in order to free up space in NVM 400.

Subsequently, an NVM interface may determine an amount of data that needs to be moved. As shown in FIG. 4, for instance, the NVM interface may have determined that end portion 402 (e.g., located to the right of the dotted line) needs to be freed up. Hence, any data that is currently located in end portion 402 may need to be relocated to an available location to the left of the dotted line. Thus, for example, the NVM interface may determine that encrypted data 404 is located in portion 402, and therefore needs to be moved.

Referring back to FIG. 3, at step 306, the NVM interface can determine a location of the NVM that is available for programming. For example, as shown in FIG. 4, the NVM interface can determine that location 406 is available for programming and is located outside of end portion 402. In some cases, end portion 402 may be located in a data partition of NVM 400, and location 406 may be located in an operating system partition of NVM 400.

Continuing to step 308, the NVM interface can read the encrypted data from the NVM using a randomly generated key (e.g., randomly generated key 260 of FIG. 2) and an IV (e.g., IV 261 of FIG. 2) generated based on the randomly generated key. The NVM interface can store the encrypted data in volatile memory (e.g., memory 114 of FIG. 1).

Then, at step 310, the NVM interface can program the encrypted data to the location of the NVM using the randomly generated key and the IV. For example, as shown in FIG. 4, after reading encrypted data 404 from NVM 400 using the randomly generated key and the IV, the NVM interface can program encrypted data 404 to location 406 using the same key and IV.

Continuing to step 312, the NVM interface can determine whether there are additional encrypted data in the portion of the NVM. If, at step 312, the NVM interface determines that there are additional encrypted data in the portion of the NVM, process 300 may return to step 306. At step 306, the NVM interface can determine a new location of the NVM that is available for programming. For example, as shown in FIG. 4, the NVM interface can determine that encrypted data 408 is still located in portion 402. Thus, the NVM interface can determine a new location 410 that is available for programming such that encrypted data 408 can be relocated to new location 410.

If, at step 312, the NVM interface instead determines that there are no additional encrypted data in the portion of the NVM, process 300 may end at step 314. Thus, using this iterative process, the portion of the NVM that is used to store data associated with a file system can be reduced to the dotted line in FIG. 4. Moreover, using such an approach, if data associated with the file system subsequently expands, no relocation of data is required. Instead, additional blocks (e.g., physical and logical blocks) can be assigned to the file system.

It should be understood that process 300 of FIG. 3 is merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for relocating files, the method comprising:
generating a randomly generated temporary key;
locating an encrypted file at a first location of a non-volatile memory ("NVM"), wherein the encrypted file was previously encrypted from plaintext data using a different key unrelated to the randomly generated temporary key;
determining, a second location of the NVM;
reading the encrypted file using the randomly generated temporary key when the different key is unavailable to unencrypt the encrypted file prior to relocation, the reading comprising unencrypting the encrypted file using the randomly generated temporary key to generate a temporary file of random data that is not equivalent to the plaintext data; and
writing the encrypted file to the second location using the randomly generated temporary key, the writing comprising encrypting the temporary file using the randomly generated temporary key to regenerate the encrypted file.

2. The method of claim 1, wherein the encrypted file is file system data.

3. The method of claim 2, wherein the first location is in an end portion of data associated with the file system.

4. The method of claim 2, wherein the second location is a region of the file system that is determined to be available for programming.

5. The method of claim 1, wherein the different key is supplied from a system key store.

6. The method of claim 1, wherein the different key is associated with an application.

7. The method of claim 6, wherein the randomly generated temporary key is not associated with the application.

8. A system comprising:
non-volatile memory ("NVM"); and
a system-on-a-chip ("SoC") comprising:
 a file system comprising a resize module operative to generate a randomly generated temporary key;
 an encryption module operative to receive the randomly generated temporary key from the file system; and
 a memory interface coupled to the encryption module, wherein the memory interface is operative to:
  direct the encryption module to decrypt at least one encrypted file stored on the NVM using at least the randomly generated temporary key to generate at least one temporary file of random data when a different key is unavailable to unencrypt the encrypted file prior to relocation, wherein the at least one encrypted file was previously encrypted from plaintext data with the different key, wherein the different key is unrelated to the randomly generated temporary key, and wherein the random data is not equivalent to the plaintext data;
  direct the encryption module to encrypt the at least one temporary file using at least the randomly generated temporary key to regenerate the at least one encrypted file; and
  relocate the at least one encrypted file to another location in the NVM, wherein the relocation resizes a portion of the NVM that is used to store data associated with the file system.

9. The system of claim 8, wherein the memory interface is operative to program boot data in additional space freed up by relocating the at least one encrypted file.

10. The system of claim 8, further comprising volatile memory comprising a system key store, wherein the encryption module is operative to receive the different key from the system key store, wherein the different key is associated with an application of the system.

11. The system of claim 8, wherein the memory interface is operative to direct the encryption module to decrypt and encrypt the at least one encrypted file using the randomly generated temporary key and at least one initialization vector.

12. The system of claim 11, wherein the file system is operative to generate the at least one initialization vector for the at least one encrypted file.

13. The system of claim 12, wherein the at least one file is associated with a plurality of logical blocks, and wherein the file system is operative to:
for each logical block associated with the at least one encrypted file, generate an initialization vector based on the randomly generated temporary key and an offset into the at least one file corresponding to the logical block.

14. A non-transitory computer readable medium having stored thereon executable instructions for a memory interface, the memory interface for managing a nonvolatile memory ("NVM") and operative to communicate with an encryption module, the memory interface operative to:
determine encrypted data in the NVM that needs to be moved, wherein the encrypted data is located in a portion of the NVM that needs to be freed up;
determine a location of the NVM that is available for programming;
read the encrypted data from the NVM using a randomly generated temporary key and an initialization vector generated based on the randomly generated temporary key, the encrypted data having been previously encrypted from plaintext data using a different key, wherein the different key is unrelated to the randomly generated temporary key, and wherein the memory interface is configured to unencrypt the encrypted data using the randomly generated temporary key and the initialization vector to generate a temporary file of random data that is not equivalent to the plaintext data when the different key is unavailable to unencrypt the encrypted file prior to relocation; and
write the encrypted data to the location of the NVM using the randomly generated temporary key and the initialization vector, wherein the memory interface is configured to encrypt the temporary file using the randomly generated temporary key and the initialization vector to regenerate the encrypted data.

15. The non-transitory computer readable medium of claim 14, wherein the encrypted data is encrypted using a media key.

16. The non-transitory computer readable medium of claim 14, wherein the memory interface is further operative to store the encrypted data that is read in volatile memory.

17. The non-transitory computer readable medium of claim 14, wherein the location of the NVM that is available for programming is located in an operating system partition.

18. The non-transitory computer readable medium of claim 14, wherein the portion of the NVM is located in a data partition.

19. The non-transitory computer readable medium of claim 14, wherein the encrypted data is file system data.

* * * * *